(12) United States Patent
Yim et al.

(10) Patent No.: US 11,379,786 B2
(45) Date of Patent: Jul. 5, 2022

(54) ELECTRONIC APPARATUS AND INFORMATION PROVIDING METHOD THEREOF

(71) Applicant: Coupang Corp., Seoul (KR)

(72) Inventors: Sang Ho Yim, Seoul (KR); Sung Eun Kim, Seoul (KR); Jeong Seok Oh, Seoul (KR); Woong Kim, Seoul (KR); Chang Geun Jin, Seoul (KR); Zhijun Xu, Seoul (KR); Xiaohua Cui, Seoul (KR); Ji Won Hwang, Seoul (KR); In Sun Jang, Seoul (KR); In Woo Park, Seoul (KR); Ji Won Park, Seoul (KR); Eung Soo Lee, Seoul (KR); Kyung Jae Lee, Seoul (KR); Sang Hee Ahn, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/081,517

(22) Filed: Oct. 27, 2020

(65) Prior Publication Data

US 2022/0067646 A1 Mar. 3, 2022

(30) Foreign Application Priority Data

Sep. 2, 2020 (KR) .................. 10-2020-0111639

(51) Int. Cl.
*G06Q 10/08* (2012.01)
*G06Q 30/04* (2012.01)

(52) U.S. Cl.
CPC ......... *G06Q 10/0832* (2013.01); *G06Q 30/04* (2013.01)

(58) Field of Classification Search
CPC .. G06Q 10/08; G06Q 10/083; G06Q 10/0833; G06Q 10/0835; G06Q 10/0836; G06Q 10/0837; G06Q 10/0838
See application file for complete search history.

(56) References Cited

U.S. PATENT DOCUMENTS 7,085,677 B1 * 8/2006 Champlin ............ G06Q 10/087
702/174
2010/0275645 A1 11/2010 Van De Rijt
(Continued)

FOREIGN PATENT DOCUMENTS

CN 109658038 A 4/2019
CN 110348679 A 10/2019
(Continued)

OTHER PUBLICATIONS

Pillai, Binu S., and Jacques Roy. Selection of Cold Chain Packaging Solution Using an Interpretive Structural Modeling (ISM) Approach. Diss. HEC Montreal. (Year: 2014).*
(Continued)

*Primary Examiner* — Emmett K. Walsh
(74) *Attorney, Agent, or Firm* — Knobbe, Martens, Olson & Bear, LLP

(57) ABSTRACT

Disclosed is an information providing method of an electronic apparatus. The information providing method includes identifying identification information of at least one item included in a set of items, and, based on the identification information of the at least one item, providing at least one of information associated with the packing material and information associated with the coolant, each information associated with the at least one item.

14 Claims, 20 Drawing Sheets

(56) References Cited

U.S. PATENT DOCUMENTS

| | | | |
|---|---|---|---|
| 2013/0268416 A1 | 10/2013 | Sandow | |
| 2017/0350635 A1* | 12/2017 | Thirumurugavel | ......................... G06Q 10/0832 |
| 2020/0057989 A1* | 2/2020 | Winkle | .............. G06Q 10/0832 |
| 2021/0103886 A1 | 4/2021 | Sezaki et al. | |

FOREIGN PATENT DOCUMENTS

| | | |
|---|---|---|
| CN | 110472899 A | 11/2019 |
| JP | 2002-099827 A | 4/2002 |
| JP | 2002-211750 A | 7/2002 |
| JP | 2002-267315 A | 9/2002 |
| JP | 2005-330056 A | 12/2005 |
| JP | 2017-058886 A | 3/2017 |
| JP | 2017-095263 A | 6/2017 |
| JP | 2020-001846 A | 1/2020 |
| JP | 2021-022035 A | 2/2021 |
| KR | 10-1515962 B1 | 5/2015 |
| KR | 10-1809007 B1 | 12/2017 |
| KR | 10-1876721 B1 | 8/2018 |
| KR | 10-2019-0000326 A | 1/2019 |
| KR | 10-1974557 B1 | 9/2019 |
| WO | WO 2019/073587 A1 | 4/2019 |

OTHER PUBLICATIONS

International Search Report for PCT/KR2020/011949 dated May 28, 2021.

* cited by examiner

FIG. 5

| A01 | A02 | A03 | A04 | A05 | | | | | |
|---|---|---|---|---|---|---|---|---|---|
| ⋮ | | ⋮ | | ⋮ | | | | | |
| C01 | C02 | C03 | C04 | C05 | C06 | C07 | | | |
| ⋮ | | ⋮ | | ⋮ | | ⋮ | | | |
| E 01 | E 02 | E 03 | E 04 | E 05 | E 06 | E 07 | E 08 | E 09 | E 10 |

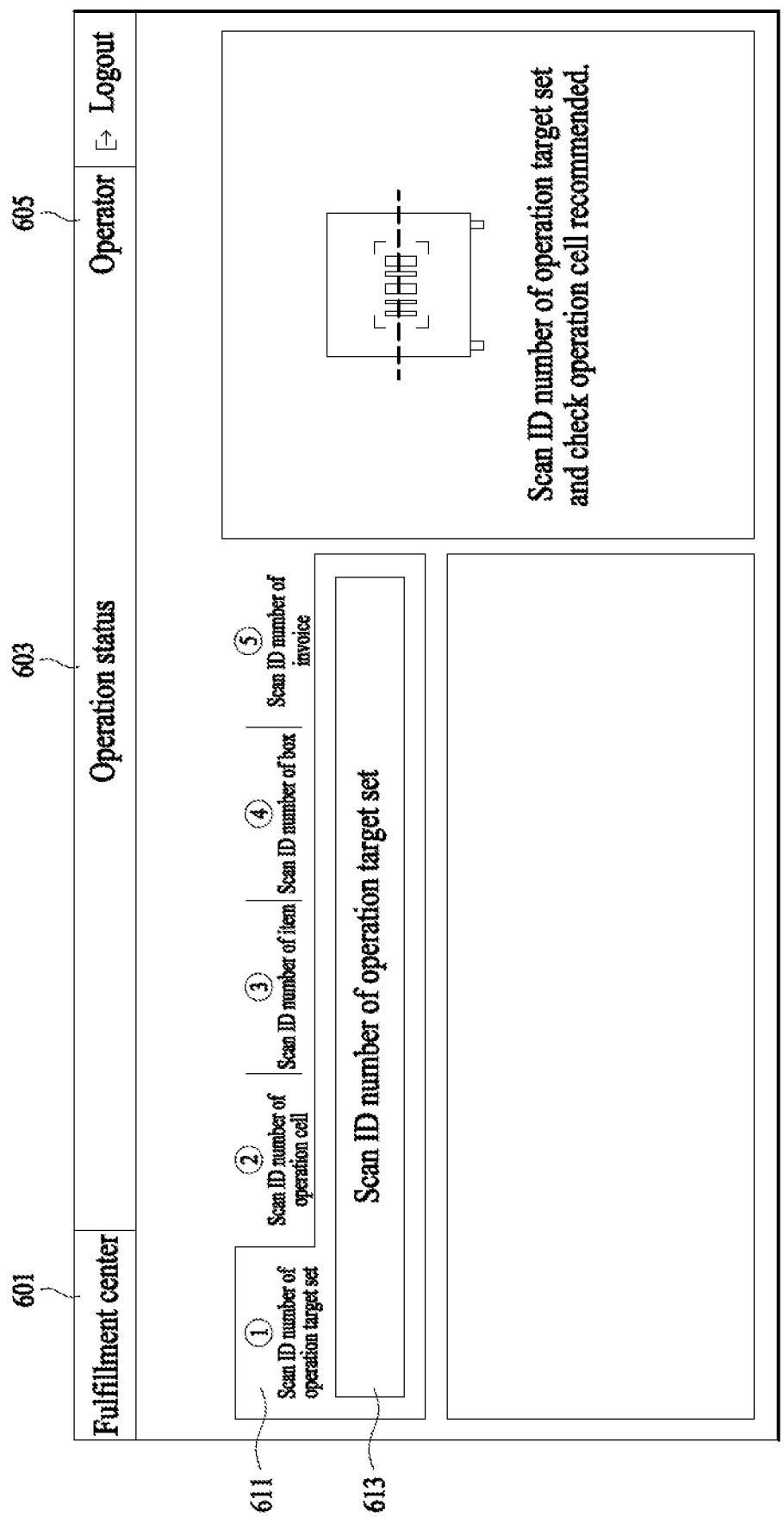

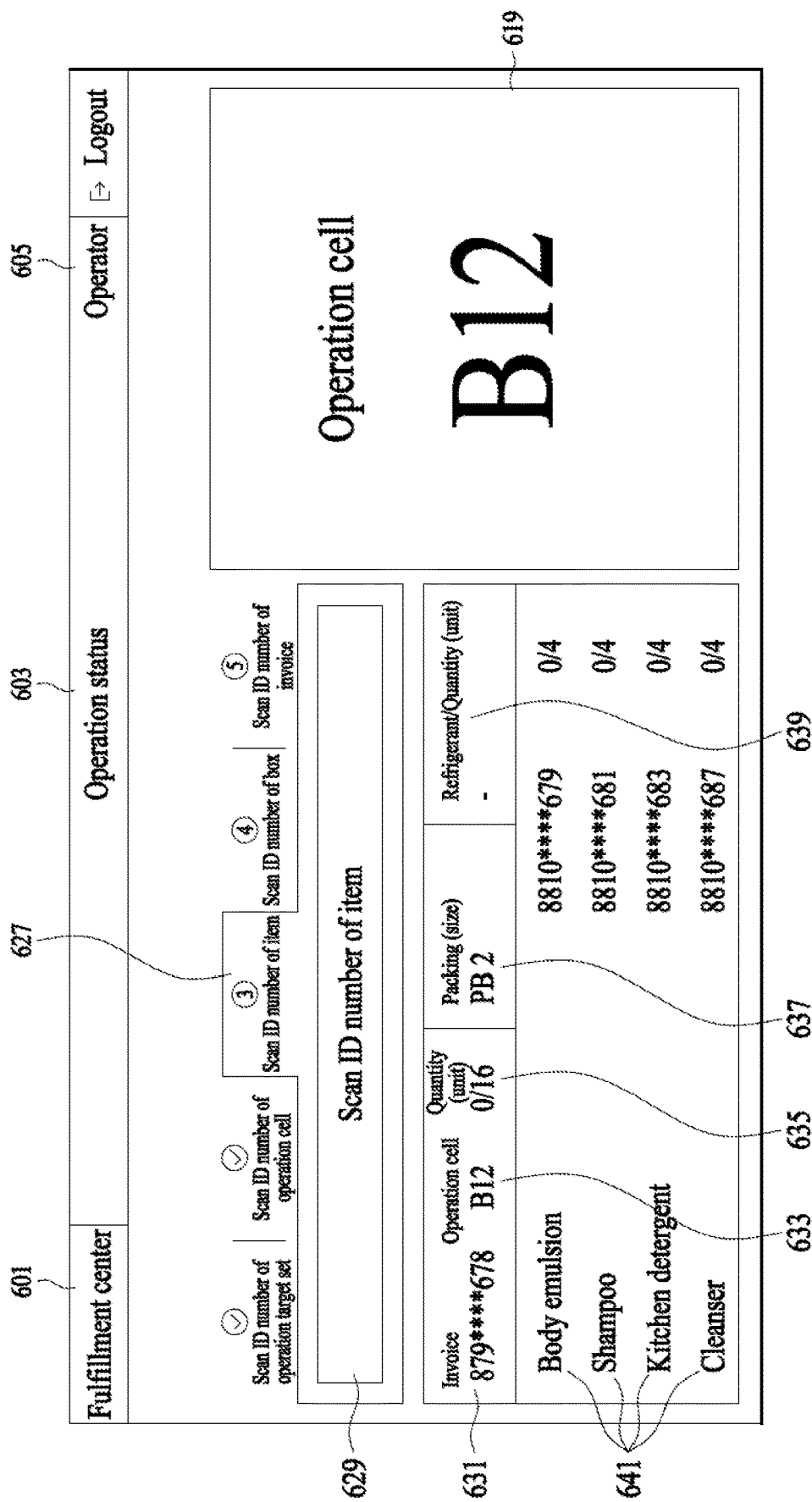

ELECTRONIC APPARATUS AND INFORMATION PROVIDING METHOD THEREOF

BACKGROUND

Technical Field

The present disclosure relates to an electronic apparatus for providing associated information to a packing operator and an information providing method thereof.

Description of the Related Art

Hundreds of thousands of items on average are being delivered every day, and it is becoming a key for an item delivery service to deliver an ordered item to a customer quickly and accurately. In addition, in the case where a fresh item is ordered, it is becoming more important to make a delivery quickly to a customer with packing the item in a manner of maintaining freshness of the item.

However, if the same packing material is used, it may be difficult to maintain freshness of an item depending on a delivery environment, and if too many coolants are used to maintain the freshness of the item, there are concerns of cost increase and environmental pollution.

Accordingly, there is a need for a technology capable of providing appropriate packing associated information to a packing operator in order to maintain freshness of an item ordered by a customer.

SUMMARY

Technical Goals

The disclosed embodiments are intended to disclose an electronic apparatus and an information providing method thereof. More specifically, the disclosed embodiments are intended to disclose an information providing method for adaptively providing packing associated information of an item according to a delivery environment, a characteristic of the item, and a type of other items to be delivered together in order to maintain freshness of the item, and an electronic apparatus using the method.

Technical goals to be achieved through the example embodiments are not limited to the technical goals as described above, and other technical tasks can be inferred from the following example embodiments.

Technical Solutions

According to a first embodiment, there is provided an information providing method of an electronic apparatus, the method including identifying identification information of at least one item included in a set of items, and based on the identification information of the at least one item, providing at least one of information associated with a packing material and information associated with a coolant, each information associated with the at least one item.

According to an embodiment, the method may further include acquiring identification information of the packing material, and, based on the acquisition of the identification information of the packing material, providing request information for acquiring invoice information corresponding to an order for the set of items.

The providing of the at least one may include providing at least one of: the information associated with the packing material and the information associated with the coolant, each information associated with the at least one item, in further consideration of order information corresponding to the set of the items.

The information associated with the coolant may be determined based on a time required for delivery since an order time corresponding to the set of items.

At least one of the information associated with the packing material and the information associated with the coolant may be determined based on at least one of date information and time information, each information corresponding to the order information.

The items may be classified as one of a first category, a second category, and a third category based on a preset criterion, and the providing of the at least one may include providing the information associated with the packing material and the information associated with the coolant, in consideration of a category of the at least one item.

When an item corresponding to the first category is packed, a temperature inside a packing material may be a first temperature, when an item corresponding to the second category is packed, a temperature inside a packing material may be a second temperature, when an item corresponding to the third category is packed, a temperature inside a packing material may be a third temperature, and the first temperature may be a lowest temperature and the third temperature may be a highest temperature.

Delivery addresses of the items included in in the set of items may correspond to a same address.

In the providing of the at least one, when the set of items includes an item corresponding to the second category and an item corresponding to the third category, the information associated with the packing material and the information associated with the coolant, each information associated with the at least one item, may include information associated with a first packing material for packing an item corresponding to the second category, information associated with a first coolant to be packed together with the item corresponding to the second category, and information associated with a second packing material for packing an item corresponding to the third category together with the first packing material.

According to a second embodiment, there is provided an electronic apparatus, including a communication device, a display, and a controller configured to identify identification information of at least one item included in a set of items and provide, based on the identification information of the at least one item, at least one of information associated with the packing material and information associated with the coolant, each information associated with the at least one item.

The controller may be further configured to provide the at least one of the information associated with the packing material and the information associated with the coolant, each information associated with the at least one item, in further consideration of order information corresponding to the set of items, and the information associated with the coolant may be determined based on a time required for delivery since an order time corresponding to the set of items.

At least one of the information associated with the packing material and the information associated with the coolant may be determined based on at least one of date information and time information, each information corresponding to the order information.

The items may be classified as one of a first category, a second category, and a third category based on a preset criterion, The controller may be further configured to provide the information associated with the packing material and the information associated with the coolant in consideration of a category of the at least one item.

According to a third embodiment, there is provided a non-transitory computer-readable recording medium having recorded thereon a program, which, when executed by a computer, performs the aforementioned method.

Details of other embodiments are included in the detailed description and drawings.

Effects

According to the proposed embodiments, there are one or more of the following effects.

According to an embodiment of the present specification, it is possible to improve convenience of a packing operator by providing a packing operation associated guide to the packing operator. In particular, by providing appropriate information associated with a packing material and information associated with a coolant to the packing operator, it is possible to exclude the packing operator's arbitrary judgment, thereby preventing a wrong packing operation. As a result, a customer's satisfaction regarding item delivery may improve. Specifically, by providing a packing operation associated guide in consideration of information associated an item category, an order date, and an order time, it is possible to recommend appropriate information regarding the packing of the item. In addition, by providing a packing associated guide in consideration of whether ordered items corresponds a single category or a plurality of categories, the customer's satisfaction regarding the item delivery may be further improved. In addition, inventory management for packing materials may become easier by acquiring identification information of the packing materials.

Effects are not limited to the aforementioned effects, and other effects not mentioned will be clearly understood by those skilled in the art from the description of the claims.

BRIEF DESCRIPTION OF THE DRAWINGS

FIG. 5 illustrates arrangement of operation cells according to an embodiment.

FIGS. 6A to 6H illustrate screens displayed on a terminal in association with a packing operator according to an embodiment.

DETAILED DESCRIPTION

Terms used in embodiments are selected among common terms that are currently widely used in consideration of their functions in the present disclosure. However, the terms may be different according to an intention of one of ordinary skill in the art, a precedent, or the advent of new technology. Also, in particular cases, the terms are discretionally selected by the applicant of the present disclosure, and the meaning of those terms will be described in detail in the corresponding part of the detailed description. Therefore, the terms used in the present disclosure are not merely designations of the terms, but the terms are defined based on the meaning of the terms and content throughout the present disclosure.

When a part is said to "include" a certain component, which means that it may further include other components, except to exclude other components unless otherwise stated. In addition, terms such as " . . . unit", " . . . module", or the like refer to units that perform at least one function or operation, and the units may be implemented as hardware or software or as a combination of hardware and software.

The expression "at least one of A, B, and C" may include the following meanings: A alone; B alone; C alone; both A and B together; both A and C together; both B and C together; and all three of A, B, and C together.

The term "terminal" mentioned below may be implemented as a computer or mobile terminal capable of accessing a server or another terminal over a network. The computer includes, for example, a laptop equipped with a web browser, a desktop, a laptop, and the like, and the mobile terminal is, for example, wireless communication device assuring portability and mobility and may include any type of handheld-based wireless communication devices like communication-based terminals, which is based on International Mobile Telecommunication (IMT), Code Division Multiple Access (CDMA), W-Code Division Multiple Access (W-CDMA), Long Term Evolution (LTE), smart phones, tablet PCs, and the like.

Hereinafter, embodiments of the present disclosure will be described in detail with reference to the accompanying drawings so that those skilled in the art can easily implement the present disclosure. However, the present disclosure may be implemented in various different forms but it is not limited to the exemplary embodiments described hereinafter.

Hereinafter, embodiments of the present disclosure will be described in detail with reference to the drawings.

Figure 1:
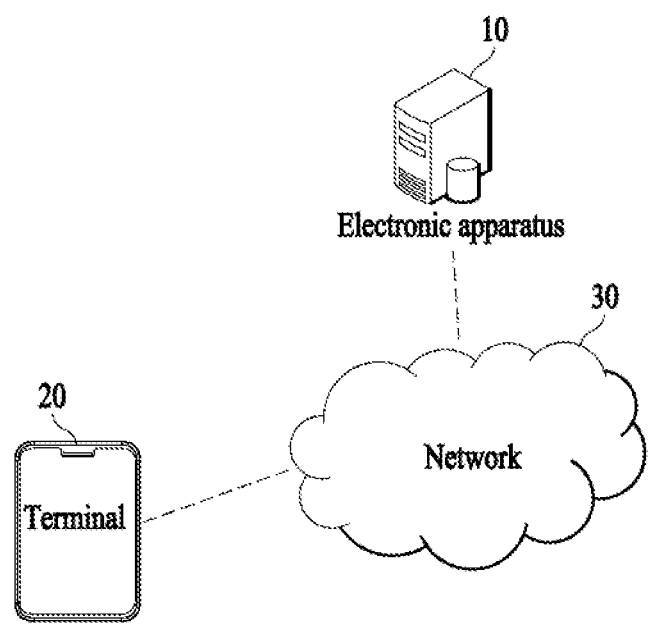
FIG. 1 shows a system according to an embodiment.

FIG. 1 shows a system according to an embodiment.

Referring to FIG. 1, the system may include at least one of: an electronic apparatus 10, a terminal 20, and a network 30. In a delivery system shown in FIG. 1, only elements related to the present embodiment are shown. Accordingly, it would be understood by one of ordinary skill in the art that general-purpose elements other than the elements shown in FIG. 1 may be further included.

The electronic apparatus 10 and the terminal 20 may communicate with each other within the network 30. The network 30 may include a Local Area Network (LAN), a Wide Area Network (WAN), a Value Added Network (VAN), a mobile radio communication network, a satellite communication network, and a combination thereof, and the network is, in a broad sense, a data network via which components of each network illustrated in FIG. 1 actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, WFD (Wi-Fi Direct), UWB (ultra wideband), infrared communication (IrDA, infrared data association)), NFC (Near Field Communication), and the like.

The electronic apparatus 10 may provide item packing associated information, and may be included in a server that provides information associated with item packing. The electronic apparatus 10 may provide an application for providing the item packing associated information to the terminal 20.

The terminal 20 may be a terminal used by a packing operator. The packing operator may perform a packing operation in association with an item included in an operation cell using the information provided through the terminal 20. Detailed information provided by the terminal 20 will be described in detail below in other drawings. An operation target set includes a plurality of operation cells, and items included in each operation cell may be delivered to a buyer using the same delivery information.

In one example, order information corresponding to a specific order may include information associated with the order. In an embodiment, an operation cell may be assigned so that an item included in a specific order can be sorted and located, a sorting operator may locate an item corresponding to order information to the cell, and when all items corresponding the order information is located at the cell, the sorting operator may provide sorting completion information to a packing operator in a preset notifying method. Based on this information, the packing operator may perform a packing operation on the items located in the operation cell. Specifically, the packing operator may perform a packing operation on an item using packing associated information provided by the electronic apparatus. More specifically, the packing operator may perform a packing operation on an item using at least one of information associated with a packing material and information associated with a coolant, each information provided by the electronic apparatus.

Hereinafter, detailed processes to be performed by the electronic apparatus 10 and the terminal 20 when providing information will be described.

Figure 2:
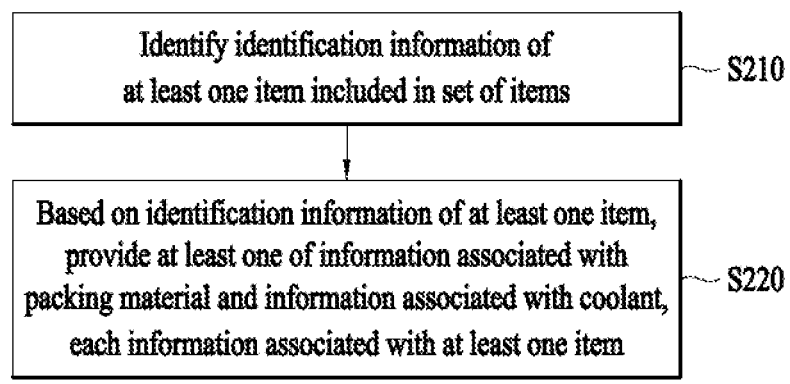
FIG. 2 illustrates an embodiment of a method of providing information to a packing operator in an embodiment.

FIG. 2 illustrates an embodiment of a method of providing information to a packing operator in the embodiment.

Referring to FIG. 2, in operation S210, an electronic apparatus may identify identification information of at least one item included in an item set. The operation target set has a unique identification number, and when the identification number is recognized by a barcode scanner, the operation target set may be recognized as a target to process. The operation target set includes a plurality of operation cells, and each operation cell may include items to be delivered based on the same delivery information. For example, Operation Target Set A includes Operation Cell 1 and Operation Cell 2, and items included in Operation Cell 1 may be delivered to Delivery Address 1, and items included in Operation Cell 2 may be delivered to Delivery Address 2. When a sorting operation for an operation cell has been completed, the electronic apparatus may display the operation cell as a target of a packing operation.

An operation cell may include a set of items to be delivered to a buyer, and the set of items may include at least one item. The item has a unique identification number, and the electronic apparatus may use a barcode scanner to identify identification information of at least one item included in the set of items. Here, the identification information may include identification number. For example, the set of items may include Item 1, Item 2, . . . , and Item N, and Item 1, Item 2, . . . , and Item N may each have unique identification information. The electronic apparatus may use a barcode scanner to identify identification information of Item 1, Item 2, . . . , and Item N, and whether all the items to be delivered to the buyer are included in an operation cell may be determined based on the order information. Here, the order information may include at least one of: order time information; order date information; and item information. Based on information regarding items ordered by a customer, the electronic apparatus may determine whether all the items are included in an operation cell.

In operation S220, the electronic apparatus may provide, based on identification information of at least one item, at least one of: information associated with a packing material and information associated with a coolant, each information associated with the at least one item. The packing operator may perform a packing operation using the associated information provided by the electronic apparatus. Here, the information associated with the packing material is information associated with a packing material used to pack an item, and may include, for example, a type and a size of packing material. In addition, the information associated with the coolant is information associated with a coolant to be packed together with an item and may include, for example, a type and a number of coolant. Here, the type of packing material may be determined in consideration of the type of coolant (e.g., a dry ice pack and an ice pack). Specifically, the type of packing material for maintaining inside temperature using the coolant may be determined. In addition, the size of packing material may be determined in consideration of the size of the item, the type of coolant, and the number of coolants. The coolant used in packing as described above may help to keep a temperature inside the packing material low.

In this case, further considering order information corresponding to a set of items, the electronic apparatus may provide at least one of the information associated with the packing material and the information associated with the coolant. Specifically, the electronic apparatus may determine at least one of the information associated with the packing material and the information associated with the coolant, based on at least one of date information, time information, and item information, each included in the order information.

According to an embodiment, the electronic apparatus may determine at least one of the information associated with the packing material and the information associated with the coolant by comparing the date information included in the order information with preset reference date information. In this case, the preset reference date information may be determined based on an experiment or previous statistics, and may be classified into a section from January 1-March 31, a section from April 1-September 30, and a section from October 1-December 31, and accordingly, the type of a packing material and the type of a coolant may change to correspond to a category of a specific item. For example, when it is determined, based on order information, that a customer placed an order on May 8, the electronic apparatus may determine at least one of information associated with a packing material and information associated with a coolant by comparing with preset reference date information. In this case, an item may be classified as one of a first category, a second category, and a third category, and the preset reference date information may be set differently for each item category. This is because reaction to an external environment may differ for each item category, and the external environment may be related to a date. Accordingly, reference date information may be set for each item category through a prior experiment. Specifically, when an item corresponds to the first category, the preset reference date information may be preset to January 1 to March 31, April 1 to September 30, and October 1 to December 31, or when an item corresponds to the second category, the preset reference date information may be preset to January 1 to April 31, May 1 to September 15, and September 16 to December 31. Or, when an item corresponds to the second category and the third category, the preset reference date information may be preset as May 1 to September 15 and others. This is because a degree of reaction to an external environment (e.g., temperature, humidity, and the like) may differ for each category. For example, if an order for an item corresponding to the first category is placed on February 10 at 11:00 and another order for the item is placed on May 8 at 11:00, the electronic apparatus may display different packing material-associated information and different coolant-associated information for each order.

According to an embodiment, the electronic apparatus may determine at least one of information associated with a packing material and information associated with a coolant, based on order time information included in the order information and a time required for a delivery from an order time. The electronic apparatus may estimate the time required for the delivery. For example, when a customer places an order between 16:01 and 10:00, one-day delivery may be possible, or when the customer places an order between 10:01 and 16:00, overnight delivery may be possible. When the overnight delivery is possible, more coolants may be needed, compared to a case where the one-day delivery is possible. For example, assuming that one coolant (e.g., a dry ice pack) is needed when an item corresponding to the first category is to be delivered on the same day, two coolants may be needed when the item is to be delivered overnight. In another example, assuming that two coolants (e.g., ice packs) is needed when an item corresponding to the second category is to be delivered on the same day, three coolants may be needed when the item is to be delivered overnight.

According to an embodiment, considering order date information and order time information, the electronic apparatus may provide at least one of information associated with a packing material and information associated with a coolant. Specifically, considering order date information and order time information, the electronic apparatus may provide different packing material-associated information and coolant-associated information for each item category.

According to an embodiment, further considering weather information, the electronic apparatus may determine at least one of information associated with a packing material and information associated with a coolant. Specifically, the electronic apparatus check weather information (e.g., weather and humidity) and estimate weather on an hourly basis. For example, if a set of items is estimated to be delivered to a customer at 14:00 based on order time information and a time required for delivery, the electronic apparatus may provide associated information so that the coolant can be changed from an ice pack to a dry ice pack when scorching heat of 36° C. or higher is anticipated as weather on a delivery date. For another example, if an order date is determined as February 3 based on the order information, the electronic apparatus may provide associated information so that more coolants can be added when a temperature on a delivery date is confirmed to have increased by 10 degrees or more than statistics. In addition, for another example, when weather on a delivery date is determined to suddenly change from scorching heat in the morning to rainfall in the afternoon, the electronic apparatus may determine information associated with a packing material and information associated with a coolant on the basis of the morning when the item is relatively more greatly affected by the weather. Meanwhile, in an embodiment, the electronic apparatus may perform a process of acquiring weather information in order to identify information associated with a delivery environment, and may determine, based on the acquired information, at least one of information associated with a packing material and information associated with a coolant, each information which is to be provided to an operator.

Figure 3:
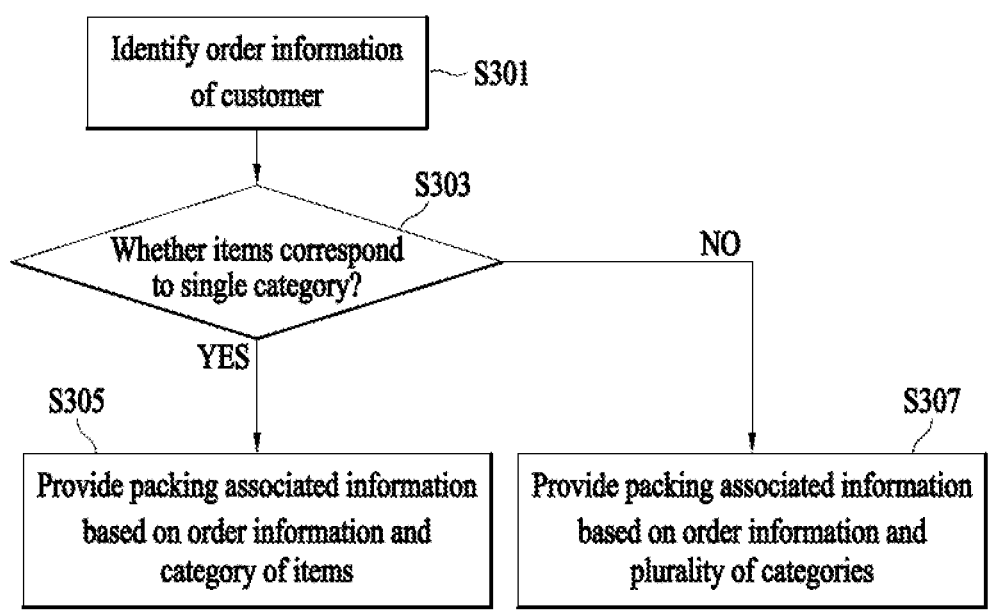
FIG. 3 illustrates an embodiment showing a process of providing packing associated information.

FIG. 3 illustrates an embodiment showing a process of providing packing associated information.

Referring to FIG. 3, in operation S301, an electronic apparatus may identify order information of a customer. Here, the order information of the customer may include order date information, order time information, and item information, and may further include information associated with an order and a delivery for the customer. Here, the order date information may be information associated with a date when the customer placed an order for items using a system, the order time information may be information associated with a time when the system confirmed the order, and the item information may be information associated with the item ordered by the customer.

In operation S303, the electronic apparatus may determine as to whether the items correspond to a single category, based on the order information. An item may be classified as one of a first category, a second category, and a third category. An item corresponding to the first category may be a frozen item, an item corresponding to the second category may be a chilled item, and an item corresponding to the third category may be an ambient temperature (Ta) storage-required item. In this case, the frozen item may be an item which is, when packed, maintained at a first temperature within a packing material, the chilled item may be an item which is, when packed, maintained at a second temperature within a packing material, and the ambient temperature (Ta) storage-required item may be an item which is, when packed, maintained at a third temperature within a packing material. In this case, the first temperature may be the lowest temperature and the third temperature may be the highest temperature. For example, the frozen item may be an item which is, when packed, maintained at −10° C. within a packing material due to a coolant (e.g., a dry ice pack), the chilled item may be an item which is, when packed, maintained at −1° C. within a packing material due to a coolant (e.g., an ice pack), and the ambient temperature (Ta) storage-required item may be an item which is, when packed without a coolant, maintained at 10° C. within a packing material.

The electronic apparatus may determine whether items ordered by the customer are items corresponding to a single category. For example, a set of items to be delivered to the customer may include only items corresponding to the first category, or may include only items corresponding to the second category, or may include only items corresponding to the third category. For another example, a set of items to be delivered to the customer may include an item corresponding to the first category and an item corresponding to the third category, or may include an item corresponding to the second category and an item corresponding to the third category.

In operation S305, the electronic apparatus may provide packing associated information based on order information and a single category of the items. In this case, the packing associated information may include information associated with a packing material information associated with a coolant. For example, if an item corresponding to the first category is ordered on June 6 at 08:00, the electronic apparatus may provide information associated with two dry ice packs as a coolant and LB No. 36 as a packing material, based on the order information and the first category. Alternatively, if an item corresponding to the first category is ordered on June 6 at 12:00, the electronic apparatus may provide information associated with three dry ice packs as a coolant and LB No. 36 as a packing material based on the order information and the first category. In another example, if an item corresponding to the second category is ordered on October 31 at 08:00, the electronic apparatus may provide information associated with one ice pack as a coolant and IPB No. 2 as a packing material, based on the order information and the second category. Alternatively, if an item corresponding to the second category is ordered on October 31 at 12:00, the electronic apparatus may provide information associated with two ice packs as a coolant and IPB No. 2 as a packing material, based on the order information and the second category. Meanwhile, information regarding a type of packing material may include information regarding a size of the packing material, and the information regarding the type of packing material may be provided based on at least one of a type and a number of items included in the packing material.

In operation S307, the electronic apparatus may provide packing associated information based on order information and a plurality of categories. Specifically, when Item A corresponding to the second category and Item B corresponding to the third category are included in the set of items, the electronic apparatus may provide information associated with a first packing material for packing Item A and information associated with a first coolant. In addition, the electronic apparatus may provide information associated with a second packing material for packing Item B together with the first packing material. Specifically, when Item A and Item B are included in the set of items, the electronic apparatus may provide packing associated information based on order information. More specifically, the electronic apparatus may provide information associated with the first packing material (e.g., the type and size of the packing material) for packing Item A and information associated with the first coolant (e.g., ice packs and the number thereof). Accordingly, a packing operator may pack Item A together with the first coolant using the first packing material. In addition, the electronic apparatus may provide information associated with the second packing material for packing Item B together with the first packing material. Accordingly, the packing operator may pack Item B and the first packing material using the second packing material. When the packing operation has been completed using the second packing material, the second packing material may be delivered to the customer. For example, if Item A corresponding to the second category and Item B corresponding to the third category are ordered on July 17 at 08:00, the electronic apparatus may display information associated with a coolant and information associated with a packing material based on the category of Item A, the category of Item B, order date information, and order time information.

Figure 4:
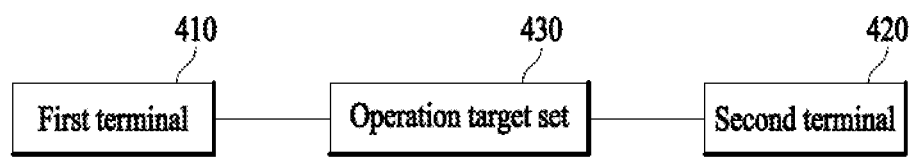
FIG. 4 illustrates arrangement of an operation target set and a terminal according to an embodiment.

FIG. 4 illustrates arrangement of an operation target set and a terminal according to an embodiment.

A first terminal 410 may be a device used by a sorting operator, and a second terminal 420 may be a device used by a packing operator. Identification information of an item may be recognized using the first terminal 410, and the item may be sorted to an operation cell included in an operation target set 430 based on the identification information. That is, the item may be allocated to the corresponding operation cell using the information displayed on the first terminal 410. For example, the identification information of Item 1 may be identified using the first terminal 410, and the first terminal 410 may display, based on the identification information, an address to which Item 1 is to be delivered. Item 1 may be allocated to Operation Cell 1 based on information displayed on the first terminal 410. In addition, identification information of Item 2 may be recognized using the first terminal 410, and the first terminal 410 may display, based on the identification information, an address to which Item 2 is to be delivered. The sorting operator may allocate Item 2 to Operation Cell 2 based on the information displayed on the first terminal 410. Item 1 and Item 2, each allocated to Operation Cell 1, may then be delivered to the same address. When an operation for Operation Cell 1 is completed, the first terminal 410 may receive a completion input from the sorting operator, and the electronic apparatus may identify the operation cell on which an item sorting operation has been completed.

The operation target set 430 may include Operation Cell 1 to Operation Cell N. In this case, the items included in the operation cell on which a sorting operation has been completed may be delivered to the same address. Items included in Operation Cell 1 may be delivered to Address 1, items included in Operation Cell 2 may be delivered to Address 2, and items included in Operation Cell N may be delivered to Address N.

The second terminal 420 may display associated information to the packing operator. Based on the priority order displayed on the second terminal 420, the packing operator may perform shipment verification and a packing operation on an operation cell. The packing operator may perform shipment verification and a packing operation on an operation cell on which a sorting operation has been completed. In this case, all sets of items included in one operation cell may be delivered to the same address. The electronic apparatus may provide packing associated information using the second terminal 420, and the packing operator may identify information associated with a packing material and information associated with a coolant, using the information displayed on the second terminal 420.

FIG. 5 illustrates arrangement of operation cells according to an embodiment.

An operation target set may include at least one operation cell. For example, the operation target set may include Operation Cell A01 to Operation Cell A05, Operation Cell C01 to Operation Cell C07, and Operation Cell E01 to Operation Cell E10. Rows of operation cells included in the operation target set may be determined in association with delivery information. For example, Operation Cell A and Operation Cell C may be differentiated based on the delivery information.

A first terminal may display an operation cell to which an item is to be allocated using identification information and delivery information of the item, and the sorting operator may sort the item to the corresponding operation cell using the first terminal. For example, the first terminal may display Operation Cell A03 to which Item 1 is to be allocated, using identification information and delivery information of Item 1, and the sorting operator may sort the item to the corresponding Operation Cell A03 using the first terminal. For another example, the first terminal may display Operation Cell A05 to which Item 2 is to be allocated, using identification information and delivery information of Item 2, and the sorting operator may sort the item to the corresponding Operation Cell A05 using the first terminal.

The first terminal may receive, from the sorting operator, an input indicating that item sorting for the operation cells has been completed, and the electronic apparatus may display, based on a priority order, at least some of the operation cells on which the item sorting has been completed. For example, if item sorting for Operation Cell A01, Operation Cell A03, Operation Cell C02, Operation Cell C06, Operation Cell E04, Operation Cell E08, and Operation Cell E10 has been completed, the electronic apparatus may determine a priority order in a descending order of Operation Cell A01, Operation Cell C02, Operation Cell E08, Operation Cell A03, Operation Cell E10, Operation Cell C06, and Operation Cell E04.

A second terminal may receive associated information from the electronic apparatus and display the same. Alternatively, the electronic apparatus may display the associated information using a display connected thereto. Shipment verification and a packing operation may be performed first on Operation Cell A01 according to the priority order, and associated information may be updated when the operation on Operation Cell A01 is completed.

FIGS. 6A to 6H illustrate screens displayed on a terminal in association with a packing operator according to an embodiment.

Figure 6A:
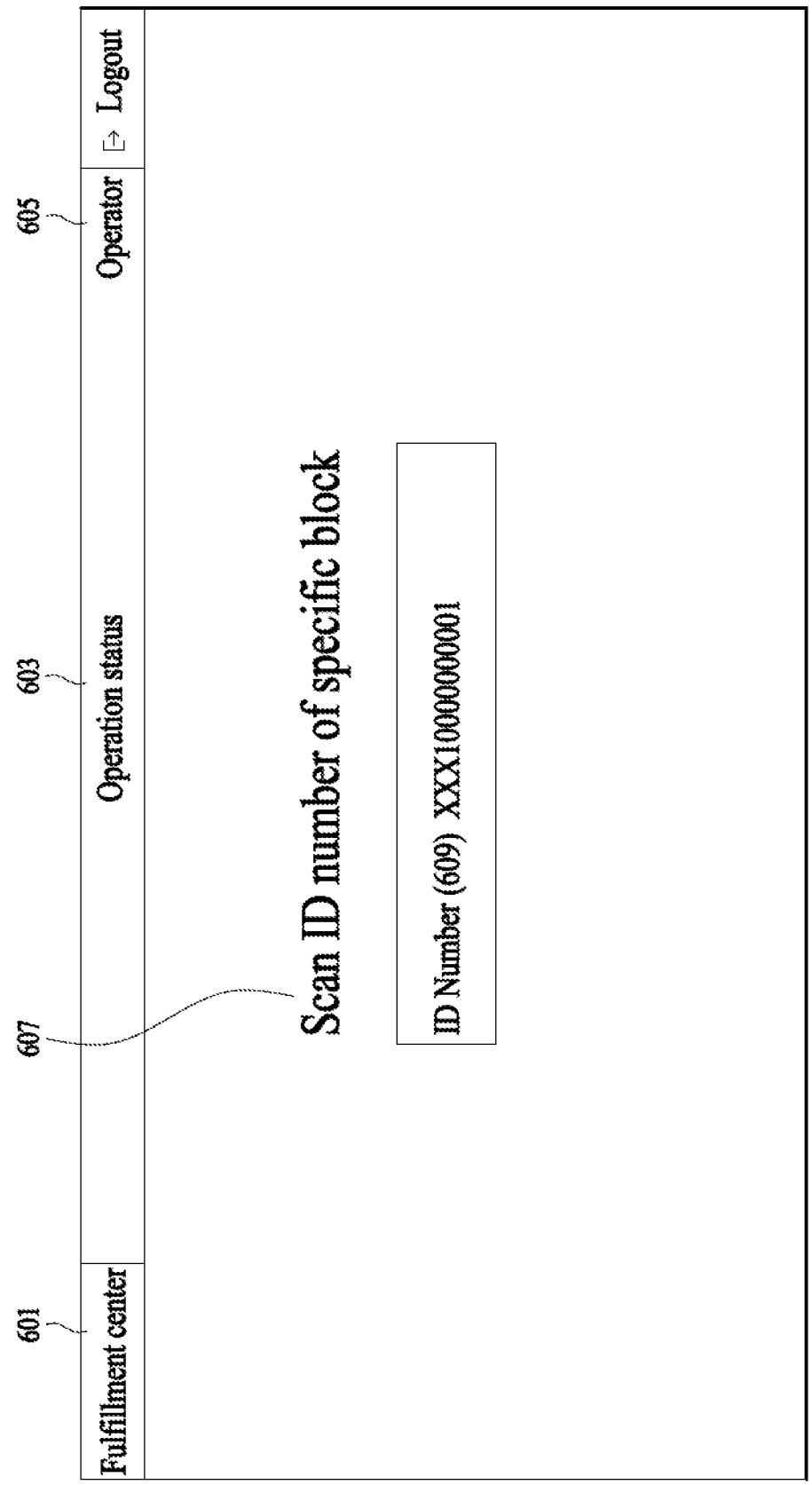

FIG. 6A illustrates identifying a specific block. An area 601 on a screen shows information associated with the fulfillment center, and, for example, a fulfillment center in XX region may be displayed. An area 603 shows an operation status related to delivery, and, for example, a packing operation stage may be displayed. An area 605 shows information associated with a person in charge of an operation, and, for example, personal information of a person Y in charge may be displayed. A fulfillment center may be divided into a plurality of blocks, and an associated operation may be performed in each block. Each block located in the fulfillment center has a unique identification number, and if a unique identification number is recognized by a barcode scanner, a corresponding block may be identified. For example, when identification number 709 XXX10000000001 is recognized, a block corresponding to the identification number may be identified.

FIG. 6B illustrates identifying an operation target set. An operation target set also has a unique identification number, and the operation target set may be identified through scanning. At this time, areas 611 and 613 may be activated.

Figure 6C:
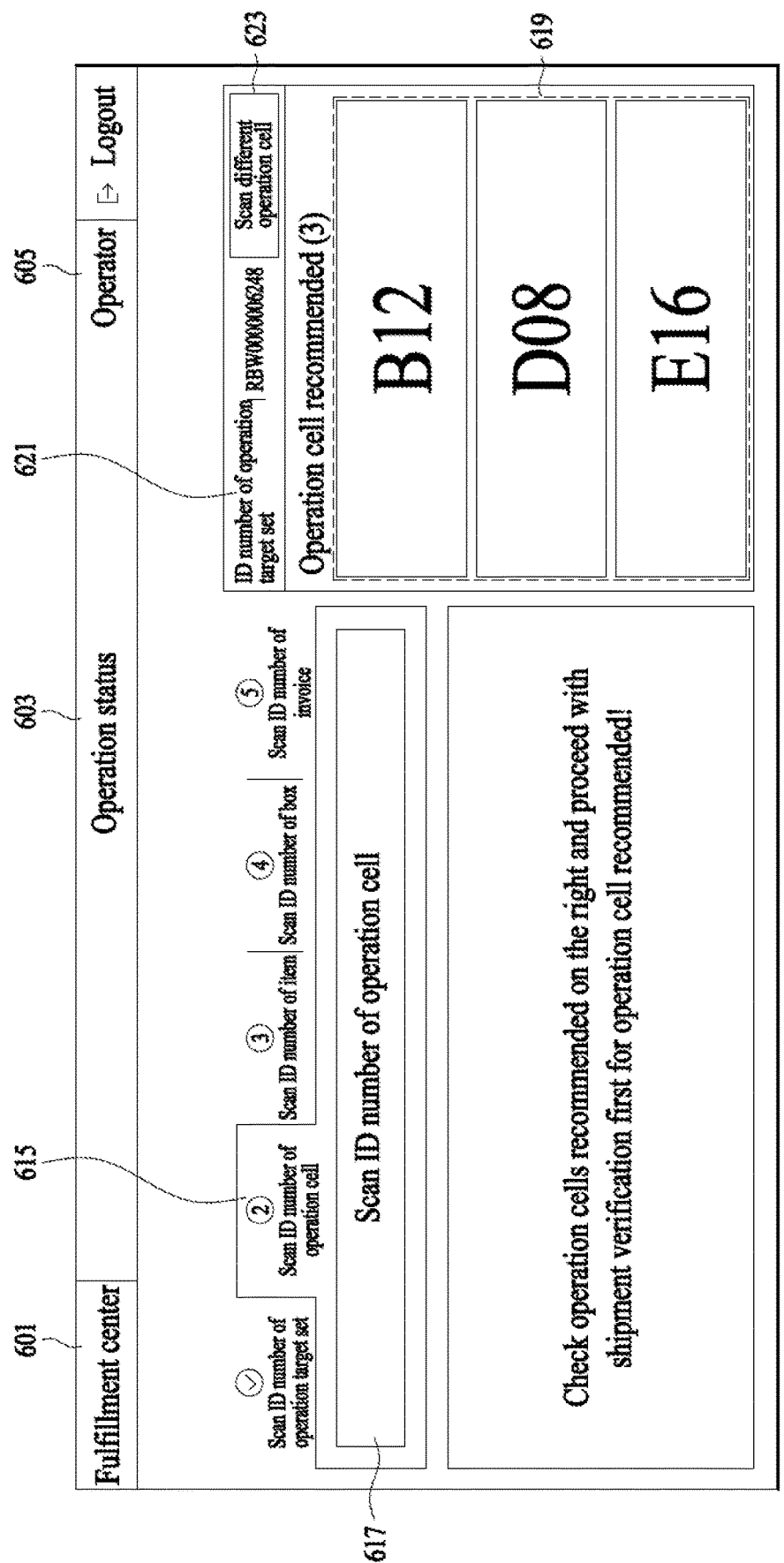

FIG. 6C illustrates identifying an operation cell. In this case, areas 615 and 617 may be activated. In this case, identification number of an operation target set 621 may be RBW0000006248. The operation target set corresponding to the identification number RBW0000006248 may include a plurality of operation cells, and the electronic apparatus may select a high-priority operation cell from operation cells on which an item sorting operation has been completed. For example, Operation Cell B12, Operation Cell D08, and Operation Cell E16 may be displayed in a priority order in an area 619 among the operation cells on which an item sorting operation has been completed, and the packing operator may perform a packing operation preferentially on the corresponding operation cells using the displayed information. In this case, when an area 623 is selected, shipment verification and a packing operation may be performed on an operation target set different from the operation target set corresponding to the identification number RBW0000006248.

Figure 6D:
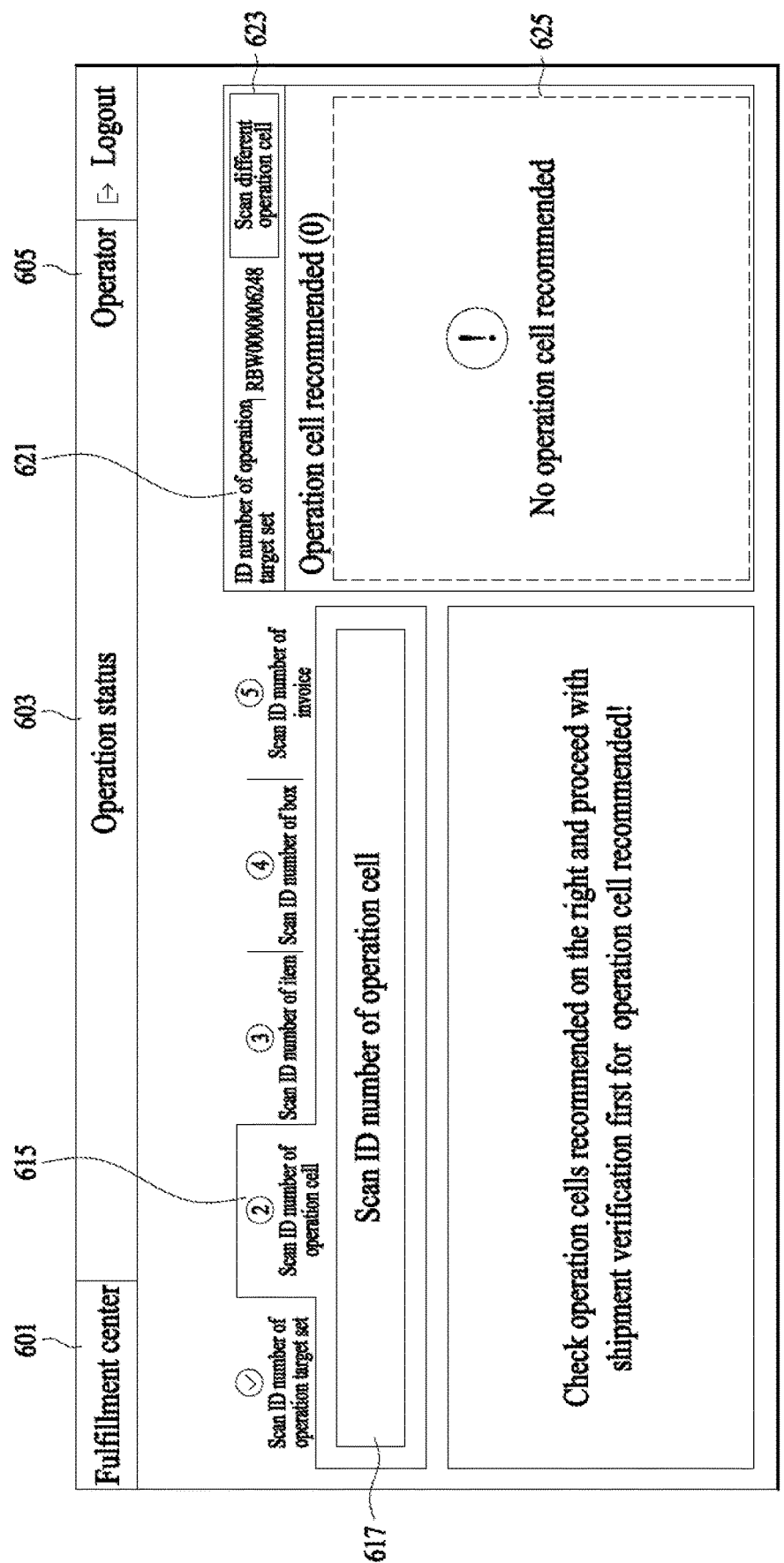

FIG. 6D illustrates a case where there is no recommended operation cell. When shipment verification and a packing operation are performed on all operation cells included in an operation target set or when there is no operation cell on which item sorting has been completed, it may be displayed as shown in an area 625.

Figure 6F:
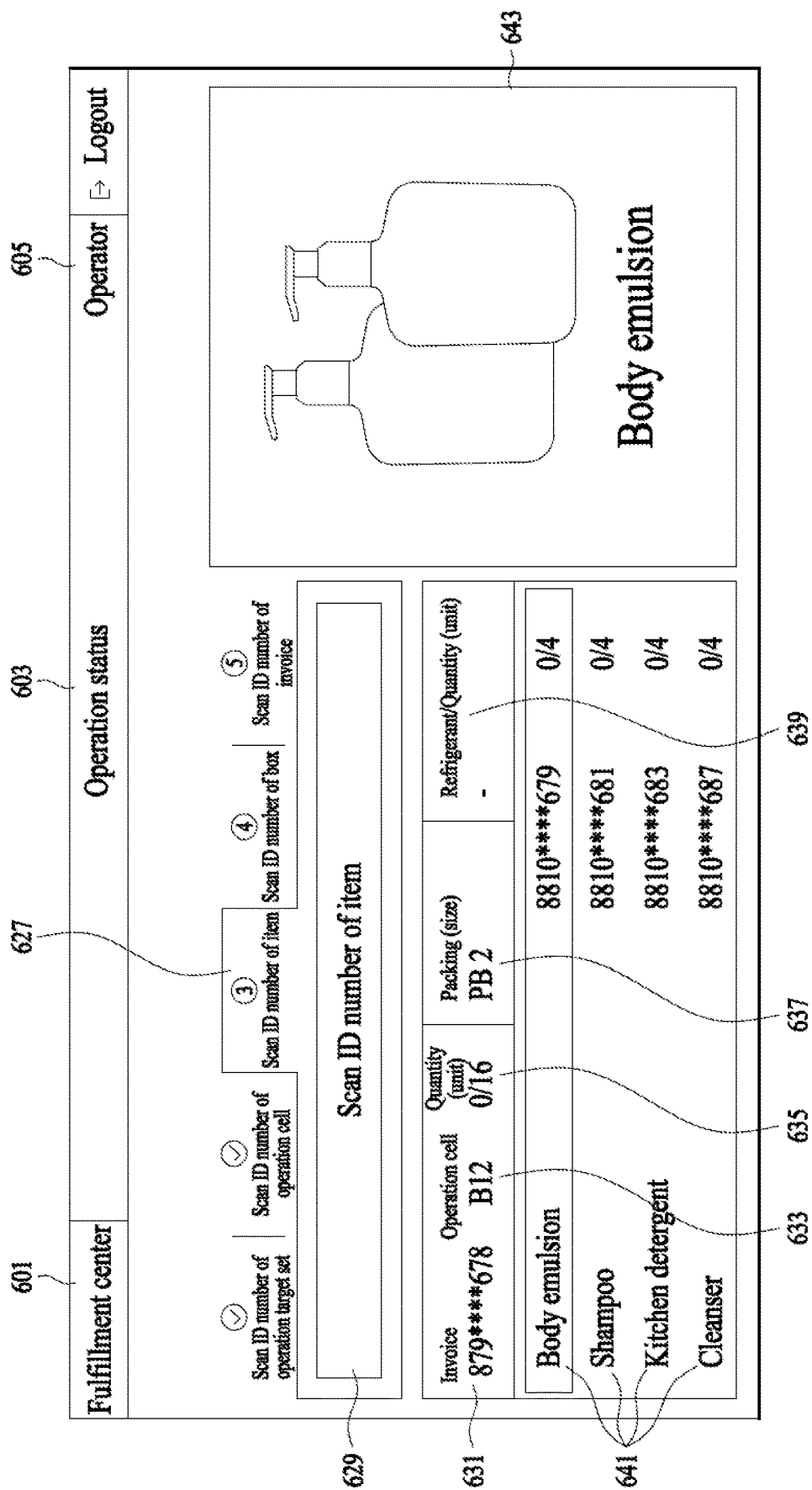

FIGS. 6E and 6F illustrate a process of identifying an item in a shipment verification process. In this case, areas 627 and 629 may be activated. An area 631 indicates an invoice number associated with Operation Cell B12, and the invoice number may be a unique number including information associated with all matters related to delivery of the item. An area 633 indicates an operation cell as a target of a packing operation, an area 635 indicates a total quantity of items included in the operation cell, and an area 637 indicates information associated with a box for a packing operation with regard to Operation Cell B12. For example, the electronic apparatus may check order information and determine and display a packing material PB 2 suitable for packing items, and the packing operator may use PB 2 to pack the items included in Operation Cell B12. An area 639 may indicate information associated with a coolant (e.g., a refrigerant). The items included in Operation Cell B12 may correspond to a category that does not require a refrigerant, and thus, the electronic apparatus may not display information associated with a coolant in the area 639. An item list 641 of the items included in Operation Cell B12 may be displayed. The item list 641 may indicate items ordered by a customer. Through barcode scanning, whether the items on the item list 641 are all included in Operation Cell B12 may be identified. When a barcode of "Body Emulsion" included in the item list 641 is scanned, associated information may be displayed in an area 643.

Figure 6G:
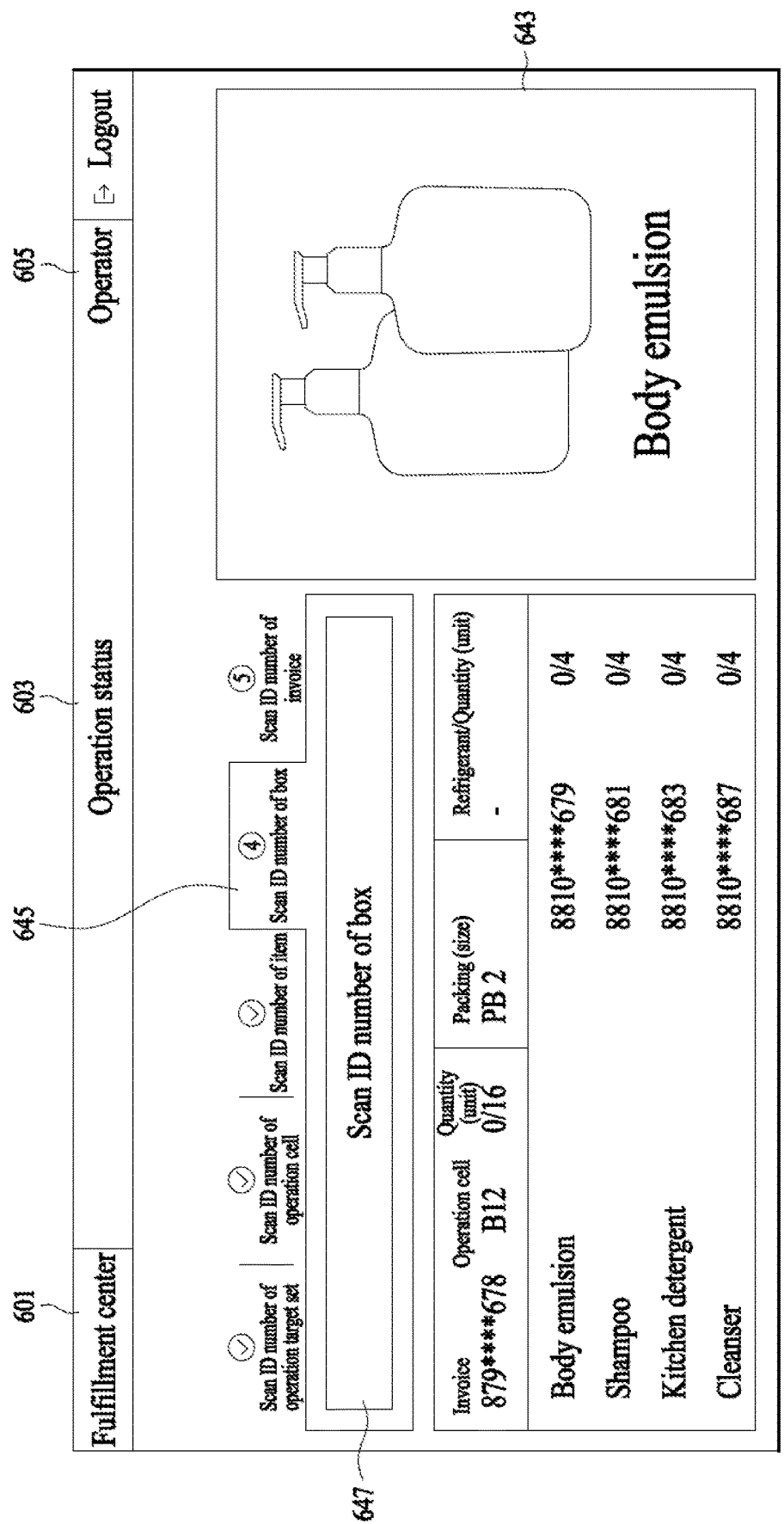

FIG. 6G illustrates a process of scanning a box barcode. When items on the item list 641 are all scanned, areas 645 and 647 may be activated. When packing for the item list 641 has been completed by the packing operation using a box, the electronic apparatus may acquire identification information of a packing material used for the packing. Specifically, when packing has been completed using a box, the electronic apparatus may acquire the identification information of the packing material through barcode scanning.

Figure 6H:
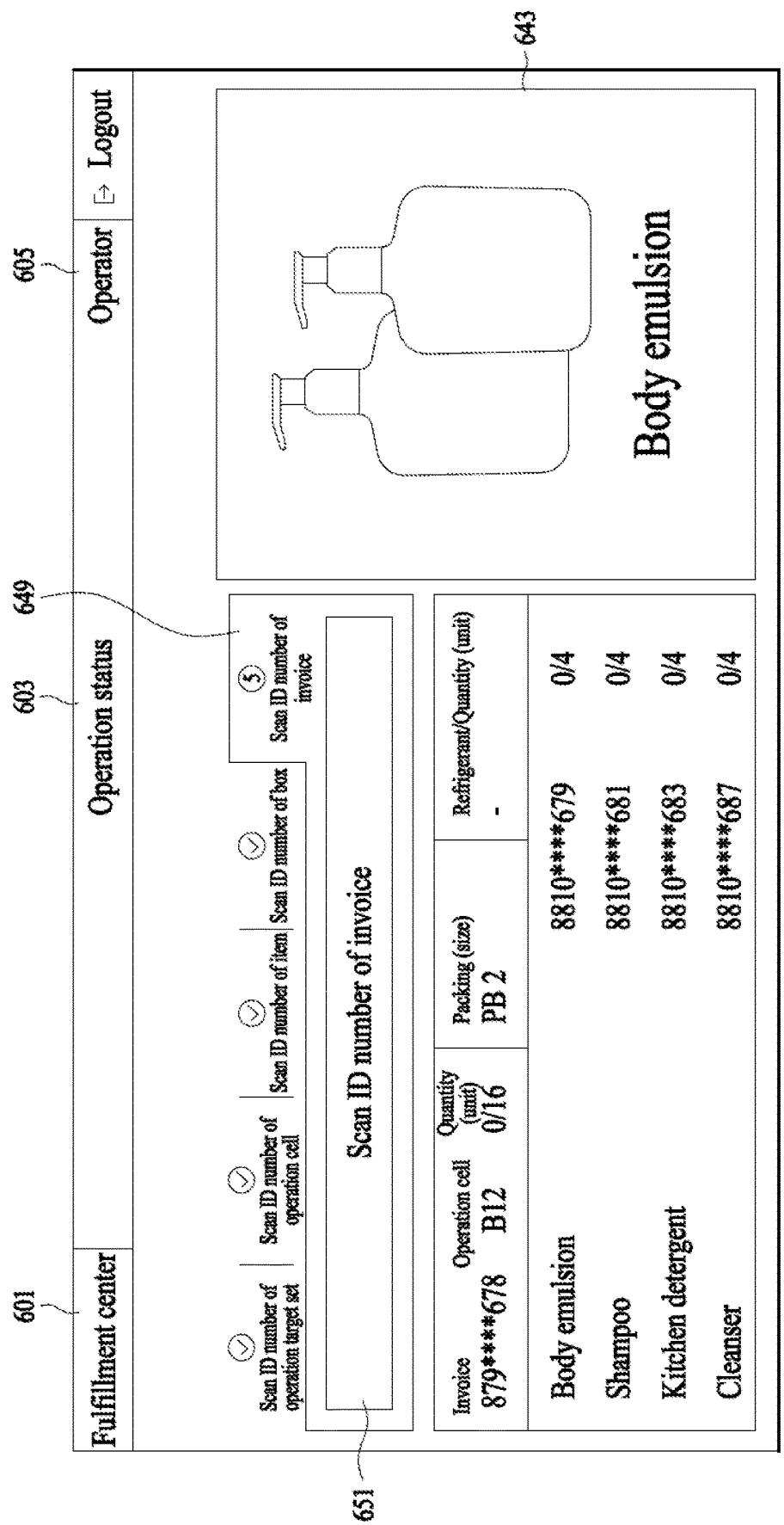

FIG. 6H illustrates a process of scanning an invoice identification number. When acquiring the identification information of the packing material through FIG. 6G, the electronic apparatus may activate an area 651 to provide request information for acquiring an invoice identification number corresponding to an order for a set of items. The electronic apparatus may identify invoice information corresponding to the invoice identification number. If the invoice identification number is scanned, shipment verification and a packing operation may be completed.

Figure 7A:
FIGS. 7A to 7C illustrate information displayed on a terminal in association with packing of items corresponding to a single category according to an exemplary embodiment.
Figure 7B:
Figure 7C:
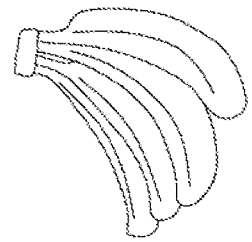

FIGS. 7A to 7C illustrate information displayed on a terminal in association with packing of items corresponding to a single category according to an exemplary embodiment.

When identification number of an operation cell is identified through barcode scanning, identification number of an item included in the operation cell may be identified. The operation cell may include at least one item to be delivered to a customer, and at least one item included in the operation cell may be delivered to the same delivery address. In this case, a packing operator may perform shipment verification and a packing operation on at least one item included in the operation cell. By scanning, by a packing operator, identification numbers of items included in the operation cell, the electronic apparatus may identify whether all items ordered by a customer are included in the operation cell. Here, the electronic apparatus may compare order information with the identification numbers of the scanned items in order to identify whether all the items ordered by the customer are included. The electronic apparatus may provide packing associated information of an item based on identification number of the item. In this case, the packing associated information may include information associated with a packing material and information associated with a coolant. Specifically, the electronic apparatus may provide the packing associated information in consideration of order information. More specifically, the electronic apparatus may provide packing associated information in consideration of whether the items included in the operation cell corresponds to a single category or a plurality of categories.

Referring to FIG. 7A, information displayed on a terminal in association with packing of items corresponding to the first category is shown. Item X1 701 has identification number IN1 and corresponds to a frozen item which needs to be stored at −10° C., and five units of Item X1 701 may be included in Operation Cell B12. Item X2 703 has identification number IN2 and corresponds to a frozen item which needs to be stored at −10° C., and three units of Item X2 703 may be included in Operation Cell B12. Identification number of Item X3 705 is IN3 corresponds to a frozen item which needs to be stored at −10° C., and two units of Item X3 705 may be included in Operation Cell B12. Item X4 707 has identification number IN4 and corresponds to a frozen item which needs to be stored at −10° C., and two units of Item X4 707 may be included in Operation Cell B12. When the identification number of Item X1 is identified through barcode scanning, the electronic apparatus may display information associated with Item X1 in an area 709. Here, −10° C. is merely an example, and the storage temperature of items corresponding to the first category may be set differently.

The electronic apparatus may provide information associated with a packing material and information associated with a coolant in consideration of order information. Here, the order information may include order date information, order time information, and item information, and may include other information associated with delivery and packing of items. Specifically, the electronic apparatus may provide the information associated with the packing material and the information associated with the coolant by comparing the order date information with preset reference date information, the electronic apparatus may also provide the information associated with the packing material and the information associated with the coolant by the order time information and information associated with a time required for delivery, and the electronic apparatus may also provide the information associated with the packing material and the information associated with the coolant by considering a category corresponding to items. For example, as shown in FIG. 7A, the electronic apparatus may provide LB 36 711 as the information associated with the packing material in consideration of the order information, and may provide two dry ice packs 713 as the information associated with the coolant. The packing operator may perform a packing operation using information provided through the electronic apparatus. Specifically, the packing operator may perform a packing operation such that two dry ice packs 713, five units of Item X1, three units of Item X2, two units of Item X3 item, and two units of Item X4 are included in the packing material LB 36 711. At this time, LB 36 711 is a packing material capable of maintaining a temperature inside the packing material at −10° C. or less using two dry ice packs, and may be determined in consideration of the size of the items.

Referring to FIG. 7B, information displayed on a terminal in association with packing of an item corresponding to the second category is shown. Item X5 715 has identification number IN5 and corresponds to a chilled item which needs to be stored at −1° C., and four units of Item X5 701 may be included in Operation Cell B12. Item X6 717 has identification number IN6 and corresponds to a chilled item which needs to be stored at −1° C., and three units of Item X6 717 may be included in Operation Cell B12. When the identification number of Item X5 is identified through barcode scanning, the electronic apparatus may display information associated with Item X5 in an area 719. Here, −11° C. is merely an example, and the storage temperature of items corresponding to the second category may be set differently.

The electronic apparatus may provide information associated with a packing material and information associated with a coolant in consideration of order information. For example, as shown in FIG. 7B, the electronic apparatus may provide IPB 2 721 as the information associated with the packing material in consideration of order information, and two ice packs 723 as the information associated with the coolant. The packing operator may perform a packing operation using information provided through the electronic apparatus. Specifically, the packing operator may perform a packing operation such that two ice packs 723, four units of Item X5, and three units of Items X6 are included in the packing material IPB 2 721. In this case, IPB 2 721 is a packing material capable of maintaining a temperature inside the packing material at −1° C. using two ice packs, and may be determined in consideration of the size of the items.

Referring to FIG. 7C, information displayed on a terminal in association with packing of items corresponding to the third category is shown. Item X7 725 has identification number IN7 and corresponds to an ambient temperature (Ta) storage-required item which needs to be stored at 10° C., and one unit of Item X7 725 may be included in Operation Cell B12. Item X8 727 has identification number IN8 and corresponds to an ambient temperature (Ta) storage-required item which needs to be stored at 10° C., and one unit of Item X8 727 may be included in Operation Cell B12. When the identification number of Item X7 is identified through barcode scanning, the electronic apparatus may display information associated with Item X7 in an area 729.

The electronic apparatus may provide information associated with a packing material and information associated with a coolant in consideration of order information. For example, as shown in FIG. 7C, the electronic apparatus may provide the FB 36 731 as the information associated with the packing material in consideration of the order information, and may provide "Do not add ice pack" 733 as the information associated with the coolant. This is because an item corresponding to the third category will not be damaged despite the absence of a coolant. The packing operator may perform a packing operation using information provided through the electronic apparatus. Specifically, the packing operator may perform a packing operation such that one unit of Item X7 and one unit of Item X8 are included in the packing material FB 36 731 without a coolant. In this case, FB 36 731 may be determined in consideration of the size of the items.

Figure 8A:
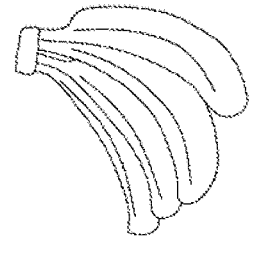
FIGS. 8A to 8C illustrate information displayed on a terminal in association with packing of items corresponding to a plurality of categories according to an exemplary embodiment.
Figure 8B:
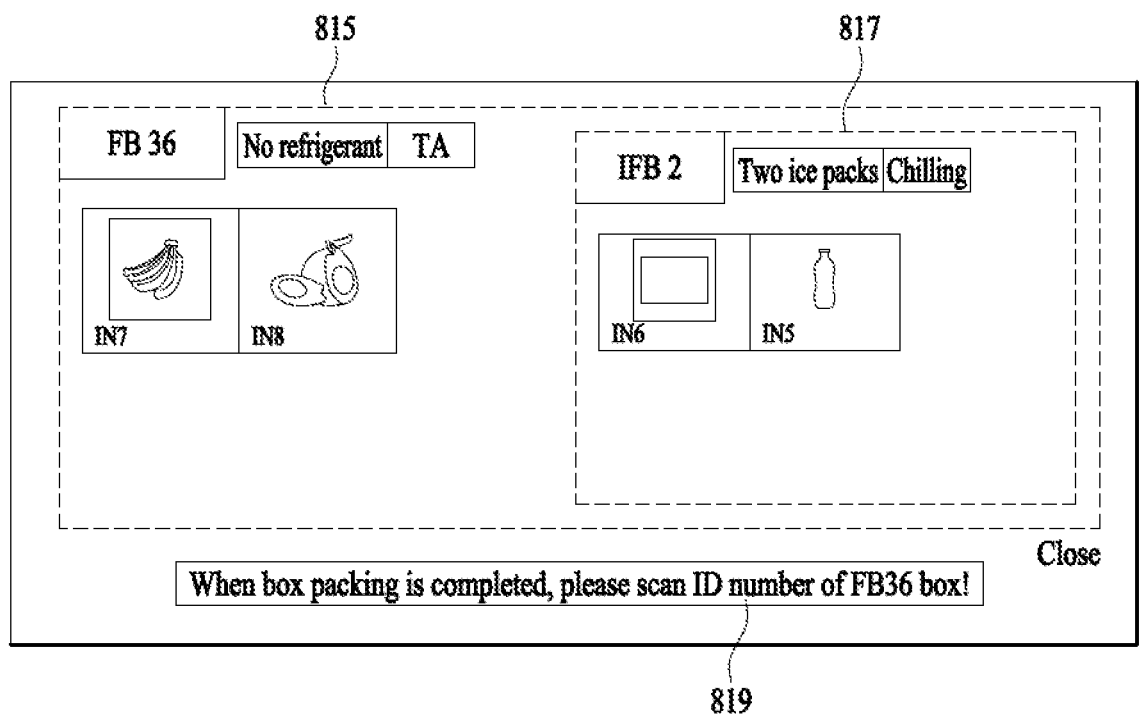
Figure 8C:
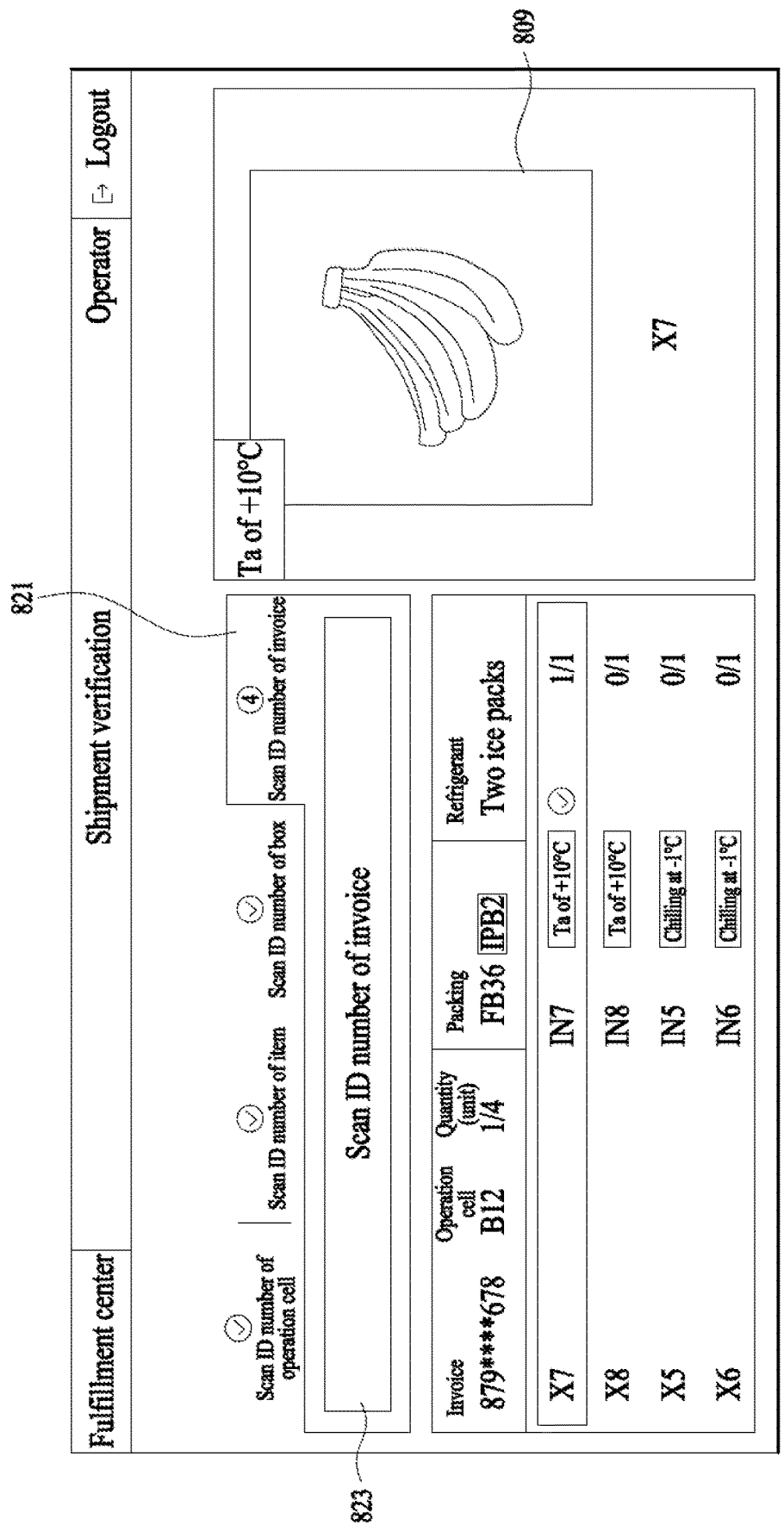

FIGS. 8A to 8C illustrate information displayed on a terminal in association with packing of items corresponding to a plurality of categories according to an exemplary embodiment.

Referring to FIG. 8A, an electronic apparatus may provide packing associated information of Items X5 and X6 corresponding to a second category and Items X7 and X8 corresponding to a third category. Item X5 805 corresponding to the second category has identification number IN5 and corresponds to a chilled item which needs to be stored at −1° C., and one item X5 may be included in Operation Cell B12. Item X6 807 corresponding to the second category has identification number IN6 and corresponds to a chilled item which needs to be stored at −1° C., and one unit of Item X6 may be included in Operation Cell B12. Item X7 801 corresponding to the third category has identification number IN7 and corresponds to an ambient temperature (Ta) storage-required item which needs to be stored at 10° C., and one unit of Item X7 may be included in Operation Cell B12. Item X8 803 corresponding to the third category has identification number IN8 and corresponds to a chilled item which needs to be stored at −1° C., and one unit of Item X6 may be included in Operation Cell B12. When the identification number of Item X7 is identified through barcode scanning, the electronic apparatus may display information associated with Item X7 in an area 809.

The electronic apparatus may provide information associated with a packing material and information associated with a coolant in consideration of order information. For example, as shown in FIG. 8A, the electronic apparatus may provide FB 36 and IPB 2 811 as the information associated with the packing material in consideration of order information, and two ice packs 813 as the information associated with the coolant. The packing operator may perform a packing operation using information provided through the electronic apparatus. Specifically, the packing operator may perform a packing operation by adding one unit of Item X5, one unit of Item X6 and two ice packs in the packing material IPB 2. In doing so, the temperature inside the packing material IPB 2 may be maintained at −1° C. The packing operator may perform a packing operation by adding one unit of Item X7, one unit of Item X8, and the packing material IPB 2 into the packing material FB 36. That is, the packing material FB 36 may include Item X7, Item X8, and the packing material IPB 2, and the packing material IPB 2 may include Item X5, Item X6, and two ice packs.

Referring to FIG. 8B, information additionally provided by an electronic apparatus when items corresponding to a plurality of categories are packed is shown. As shown in an area 817, the electronic apparatus may provide associated information so that Item X6 corresponding to IN6, Item X5 corresponding to IN5, and two ice packs are included in the packing material IPB 2. Also, as shown in an area 815, the electronic apparatus may provide associated information so that Item X7 corresponding to IN7, Item X8 corresponding to IN8, and the packing material IPB 2 are included in the packing material FB 36. When packing is completed using the packing material, the electronic apparatus may provide information for acquiring identification information of the packing material in an area 819. When a user scans the identification number of the packing material FB 36 according to the information provided in the area 819, the electronic apparatus may obtain the identification number of the packing material. Accordingly, the electronic apparatus may monitor information associated with a packing material and thereby perform inventory management regarding packing materials.

Referring to FIG. 8C, when packing has been completed, the electronic apparatus may provide request information for acquiring invoice information. Specifically, by using areas 821 and 823, the electronic apparatus may provide the request information for acquiring invoice information.

Meanwhile, according to an embodiment, when items corresponding to only one category are packed with one packing material, it is possible to change the number of coolant based on order date information and order time information, and when items corresponding to a plurality of categories are included in one packing material, it is possible to change both the type of the packing material and the number of coolants based on the order date information and the order time information. In addition, for example, changing the packing material may include changing only a packing material that is to be packed inside another packing material.

Figure 9:
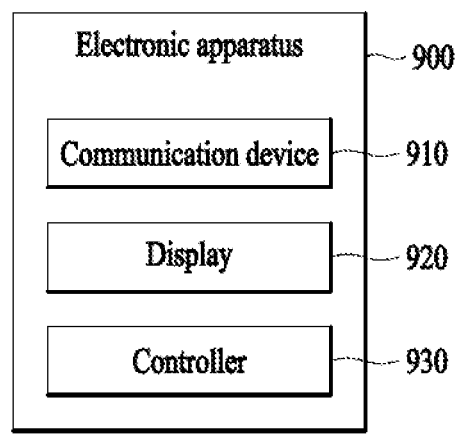
FIG. 9 is a block diagram of an electronic apparatus according to an exemplary embodiment.

FIG. 9 is a block diagram of an electronic apparatus according to an exemplary embodiment.

An electronic apparatus 900 may include a communication device 910, a display 920, and a controller 920 according to an embodiment. In the electronic apparatus 900 shown in FIG. 8, only elements related to the present embodiment are shown. Accordingly, it may be understood by one of ordinary skill in the art related to the present embodiment that other general-purpose elements may be further included in addition to the elements shown in FIG. 8. Since the description of the above-described electronic apparatus is applicable to the electronic apparatus 900, a repeated description will be omitted.

The communication device 910 is a device for performing wired/wireless communication and may communicate with an external electronic apparatus. The external electronic apparatus may be a terminal or a server. In addition, a communication technology used by the communication device 1030 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like. In an embodiment, the communication device 910 may be referred to as a transceiver, and the electronic apparatus 900 may exchange information with an external node through the transceiver.

The display 920 may display information associated with an operation of the electronic apparatus 900. For example, the display 920 may display information associated with an operation cell. For example, the display 920 may display information associated with a packing material and information associated with a coolant.

The controller 930 may control overall operations of the electronic apparatus 900 and may process data and signals. The controller 930 may be configured as at least one hardware unit. In addition, the controller 930 may operate by one or more software modules generated by executing program codes stored in the memory. The controller 930 may include a processor and a memory, and the processor may control overall operations of the electronic apparatus 900 and process data and signals by executing program codes stored in the memory. Also, in an embodiment, the controller 930 may include at least one processor.

The control unit 930 may provide the information associated with the packing material and information associated with the coolant based on identification information and order information of items. In this case, the controller 930 may provide the information associated with the packing material and the information associated with the coolant in consideration of at least one of: an item category; order date information; order time information; delivery time information; and weather information. In doing so, a packing operator's wrong packing operation may be prevented, and a packing material and coolant suitable for items may be used to deliver the items to a customer, thereby improving customer satisfaction.

The electronic apparatus or terminal according to the above-described embodiments may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. A method comprising:
   receiving, by a transceiver of an electronic apparatus, from a barcode scanner via a communication network, data indicative of identification information of at least one item among a set of items for an order, the identification information based on scanned data related to the at least one item, the set of items including a first subset and a second subset;
   receiving, by the transceiver, from a first terminal used by a sorting operator via the communication network, data indicative of the set of items being allocated to an operation cell of a fulfillment center;
   accessing, by a controller of the electronic apparatus, from a storage medium accessible by the controller, prior delivery data related to a plurality of prior deliveries of items, the prior delivery data including information relating to corresponding packing and cooling material used for the plurality of prior deliveries, the storage medium configured to store the prior delivery data in a classified manner based on reference dates and categories associated with the items of the plurality of prior deliveries;
   determining, by the controller, a match between the identification information of the at least one item and at least a portion of the prior delivery data;
   accessing, by the controller, order information corresponding to the at least one item, the order information including date information of the order;
   accessing, by the controller, weather information associated with the order based on an amount of time required for a delivery of the at least one item, wherein the amount of time required for the delivery is counted from a first point in time at which the order corresponding to the at least one item is placed and to a second point in time at which the delivery is completed;
   accessing, by the controller, information on a plurality of categories associated with the at least one item based on the order information;
   in response to the identification information of the at least one item and the data indicative of the set of items being allocated to the operation cell, executing program codes to compute, by the controller, data relating to a packing material for the at least one item to be packed together with other ones of the set of items, wherein the computing of the data relating to the packing material is based on (i) an amount and a type of cooling material required for the delivery of the at least one item to its destination in accordance with the match, (ii) the amount of time required for the delivery, (iii) the date information of the order, (iv) the weather information associated with the order, and (v) the information on the plurality of categories associated with the at least one item, the data relating to the packing material including information corresponding to the first subset and information corresponding to the second subset, the information corresponding to the first subset indicating a requirement for distribution at a first temperature lower than a second temperature for distribution of the second subset;
   transmitting, by the transceiver and via the communication network, the computed data relating to the packing material to a second terminal, the second terminal used by a packing operator at the fulfillment center;
   receiving, by the second terminal, the computed data related to the packing material;
   causing identification information regarding the packing material and the computed data related to the packing material to be displayed on the second terminal to facilitate having the packing operator pack the at least one item associated with the plurality of categories using the packing material indicated by the identification information, the identification information regarding the packing material and the computed data displayed on the second terminal including an indication of a first packing material for maintaining the first subset at the first temperature within a first area of a box and a second packing material for maintaining the second subset at the second temperature within a second area of the box;
   receiving, by the transceiver and from the second terminal, scanned identification information regarding the first packing material and the second packing material used in the packing of the at least one item;

receiving, by the transceiver and from the second terminal, scanned identification numbers regarding the first subset and the second subset and a box barcode; and verifying that i) an amount and a type of the first packing material and the second packing material identified by the scanned identification information match the amount and the type of the of the cooling material identified by the identification information displayed on the second terminal and that ii) the first subset, the second subset, the first packing material, and the second packing material are packed into the respective first and second areas of the box.

2. The method of claim 1, further comprising:

based on the received identification information regarding the packing material, generating data including a request for acquiring data relating to an invoice corresponding to an order for the set of items.

3. The method of claim 1, wherein the determining of the data relating to the packing material is further based on an order corresponding to the set of the items.

4. The method of claim 3, wherein the amount and the type of the cooling material required for the delivery of the at least one item to its destination are determined based on the amount of time required for the delivery.

5. The method of claim 3, wherein the data relating to the packing material is determined based on at least time information, the time information corresponding to the order.

6. The method of claim 1, wherein the set of items are each classified as one of a first category, a second category, or a third category based on a preset criterion, wherein the determining of the data relating to the packing material is further based on the category of the at least one item.

7. The method of claim 6, further comprising at least one of:

based on the at least one item corresponding to the first category, determining the packing material so as to maintain a first temperature inside the packing material during the delivery;

based on the at least one item corresponding to the second category, determining the packing material so as to maintain a second temperature inside the packing material during the delivery; or based on the at least one item corresponding to the third category, determining the packing material so as to maintain a third temperature inside the packing material during the delivery;

wherein the first temperature is a lowest temperature and the third temperature is a highest temperature among the first, the second, and the third temperatures, and wherein the first temperature corresponds to an order of a frozen product, and the third temperature corresponds to an order of a product which does not require any cooling material to be packed together for delivery.

8. The method of claim 1, wherein delivery addresses of the set of items correspond to a same address.

9. The method of claim 7, further comprising:

based on the set of items comprising an item corresponding to the second category and another item corresponding to the third category, identifying a first packing material for packing the item corresponding to the second category and a first cooling material to be packed together with the item corresponding to the second category, and a second packing material for packing the another item corresponding to the third category together with the first packing material.

10. A non-transitory computer-readable medium having stored thereon a program, which when executed, causes a computer to:

receive, by a transceiver of an electronic apparatus, from a barcode scanner via a communication network, data indicative of identification information of at least one item among a set of items for an order, the identification information based on scanned data related to the at least one item, the set of items including a first subset and a second subset;

receive, by the transceiver, from a first terminal used by a sorting operator via the communication network, data indicative of the set of items being allocated to an operation cell of a fulfillment center;

access, by a controller of the electronic apparatus, from a storage medium accessible by the controller, prior delivery data related to a plurality of prior deliveries of items, the prior delivery data including information relating to corresponding packing and cooling material used for the plurality of prior deliveries, the storage medium configured to store the prior delivery data in a classified manner based on reference dates and categories associated with the items of the plurality of prior deliveries;

determine, by the controller, a match between the identification information of the at least one item and at least a portion of the prior delivery data;

access, by the controller, order information corresponding to the at least one item, the order information including date information of the order;

access, by the controller, weather information associated with the order based on an amount of time required for a delivery of the at least one item, wherein the amount of time required for the delivery is counted from a first point in time at which the order corresponding to the at least one item is placed and to a second point in time at which the delivery is completed;

access, by the controller, information on a plurality of categories associated with the at least one item based on the order information;

in response to the identification information of the at least one item and the data indicative of the set of items being allocated to the operation cell, execute program codes to compute, by the controller, data relating to a packing material for the at least one item to be packed together with other ones of the set of items, wherein the computing of the data relating to the packing material is based on (i) an amount and a type of cooling material required for the delivery of the at least one item to its destination in accordance with the match, (ii) the amount of time required for the delivery, (iii) the date information of the order, (iv) the weather information associated with the order, and (v) the information on the plurality of categories associated with the at least one item, the data relating to the packing material including information corresponding to the first subset and information corresponding to the second subset, the information corresponding to the first subset indicating a requirement for distribution at a first temperature lower than a second temperature for distribution of the second subset;

transmit, by the transceiver and via the communication network, the computed data relating to the packing material to a second terminal, the second terminal used by a packing operator at the fulfillment center;

cause identification information regarding the packing material and the computed data relating to the packing material to be displayed on the second terminal to facilitate having the packing operator pack the at least one item associated with the plurality of categories using the packing material indicated by the identification information, the identification information regarding the packing material and the computed data displayed on the second terminal including an indication of a first packing material for maintaining the first subset at the first temperature within a first area of a box and a second packing material for maintaining the second subset at the second temperature within a second area of the box;

receive, by the transceiver and from the second terminal, scanned identification information regarding the first packing material and the second packing material used in the packing of the at least one item;

receive, by the transceiver and from the second terminal, scanned identification numbers regarding the first subset and the second subset and a box barcode; and verify that i) an amount and a type of the first packing material and the second packing material identified by the scanned identification information match the amount and the type of the of the cooling material identified by the identification information displayed on the second terminal and that ii) the first subset, the second subset, the first packing material, and the second packing material are packed into the respective first and second areas of the box.

11. An apparatus, comprising:
a communication device;
a display;
a storage medium; and
a controller configured to:
  receive, by the communication device and from a barcode scanner via a communication network, data indicative of identification information of at least one item among a set of items for an order, the identification information based on scanned data related to the at least one item, the set of items including a first subset and a second subset;
  receive, by the communication device and from a first terminal used by a sorting operator via the communication network, data indicative of the set of items being allocated to an operation cell of a fulfillment center;
  access, from the storage medium, prior delivery data related to a plurality of prior deliveries of items, the prior delivery data including information relating to corresponding packing and cooling material used for the plurality of prior deliveries, the storage medium configured to store the prior delivery data in a classified manner based on reference dates and categories associated with the items of the plurality of prior deliveries;
  determine a match between the identification information of the at least one item and at least a portion of the prior delivery data;
  access, by the controller, order information corresponding to the at least one item, the order information including date information of the order;
  access, by the controller, weather information associated with the order based on an amount of time required for a delivery of the at least one item, wherein the amount of time required for the delivery is counted from a first point in time at which the order corresponding to the at least one item is placed and to a second point in time at which the delivery is completed;
  access, by the controller, information on a plurality of categories associated with the at least one item based on the order information;
  in response to the identification information of the at least one item and the data indicative of the set of items being allocated to the operation cell, executing program codes to compute data relating to a packing material for the at least one item to be packed together with other ones of the set of items, wherein the computing of the data relating to the packing material is based on (i) an amount and a type of cooling material required for the delivery of the at least one item to its destination in accordance with the match, (ii) the amount of time required for the delivery, (iii) the date information of the order, (iv) the weather information associated with the order, and (v) the information on the plurality of categories associated with the at least one item, the data relating to the packing material including information corresponding to the first subset and information corresponding to the second subset, the information corresponding to the first subset indicating a requirement for distribution at a first temperature lower than a second temperature for distribution of the second subset;
  transmit, by the communication device via the communication network, the computed data relating to the packing material to a second terminal, the second terminal used by a packing operator at the fulfillment center;
  cause identification information regarding the packing material and the computed data relating to the material to be displayed on the second terminal to facilitate packing having the packing operator pack the at least one item associated with the plurality of categories using the packing material indicated by the identification information, the identification information regarding the packing material and the computed data displayed on the second terminal including an indication of a first packing material for maintaining the first subset at the first temperature within a first area of a box and a second packing material for maintaining the second subset at the second temperature within a second area of the box;
  receive, by the transceiver and from the second terminal, scanned identification information regarding the first packing material and the second packing material used in the packing of the at least one item;
  receive, by the transceiver and from the second terminal, scanned identification numbers regarding the first subset and the second subset and a box barcode; and
  verify that i) an amount and a type of the first packing material and the second packing material identified by the scanned identification information match the amount and the type of the of the cooling material identified by the identification information displayed on the second terminal and that ii) the first subset, the second subset, the first packing material, and the second packing material are packed into the respective first and second areas of the box.

12. The apparatus of claim 11,
wherein the controller is further configured to determine the data relating to the packing material based further on an order corresponding to the set of items; and
wherein the amount and the type of the cooling material required for the delivery of the at least one item to its destination are determined based on the amount of time required for the delivery.

13. The apparatus of claim 11,
wherein the data relating to the packing material is determined based on at least time information, the time information corresponding to the order.

14. The apparatus of claim 11,
wherein the set of items are each classified as one of a first category, a second category, or a third category based on a preset criterion, and
wherein the controller is further configured to determine the data relating to the packing material based on the category of the at least one item, wherein:

when the at least one item corresponds to the first category, the packing material is configured to be determined so as to maintain a first temperature inside the packing material during the delivery;
when the at least one item corresponds to the second category, the packing material is configured to be determined so as to maintain a second temperature inside the packing material during the delivery; and
when the at least one item corresponds to the third category, the packing material is configured to be determined so as to maintain a third temperature inside the packing material during the delivery,
wherein the first temperature is a lowest temperature and the third temperature is a highest temperature among the first, the second, and the third temperatures, and
wherein the first temperature corresponds to an order of a frozen product, and the third temperature corresponds to an order of a product which does not require any cooling material to be packed together for delivery.

* * * * *